(12) United States Patent
Kim et al.

(10) Patent No.: US 9,841,011 B2
(45) Date of Patent: Dec. 12, 2017

(54) LINEAR COMPRESSOR AND A LINEAR MOTOR FOR A LINEAR COMPRESSOR

(71) Applicant: LG ELECTRONICS INC., Seoul (KR)

(72) Inventors: Junghae Kim, Seoul (KR); Changkyu Kim, Seoul (KR); Sunghyun Ki, Seoul (KR); Youngcheol Han, Seoul (KR); Kyeongweon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 14/666,693

(22) Filed: Mar. 24, 2015

(65) Prior Publication Data

US 2016/0017872 A1  Jan. 21, 2016

(30) Foreign Application Priority Data

Jul. 21, 2014  (KR) .................. 10-2014-0091881
Jul. 21, 2014  (KR) .................. 10-2014-0091882

(51) Int. Cl.
*F04B 17/04*  (2006.01)
*F04B 35/04*  (2006.01)
(Continued)

(52) U.S. Cl.
CPC ............ *F04B 35/04* (2013.01); *F04B 35/045* (2013.01); *F04B 39/121* (2013.01); *H02K 1/145* (2013.01);
(Continued)

(58) Field of Classification Search
CPC ...... F04B 35/04; F04B 35/045; F04B 39/121; H02K 1/145; H02K 7/08; H02K 1/185; H02K 33/16
See application file for complete search history.

(56) References Cited

U.S. PATENT DOCUMENTS 7,331,772 B2 * 2/2008 Jung .................. F04B 35/045
                                                   417/417
7,887,306 B2 * 2/2011 Lee ..................... F04B 35/045
                                                   417/363
(Continued)

FOREIGN PATENT DOCUMENTS

CN   1574569   2/2005
CN   1769680   5/2006
(Continued)

OTHER PUBLICATIONS

Chinese Office Action dated Jan. 25, 2017 (English Translation).
European Search Report dated Nov. 26, 2015.

*Primary Examiner* — Charles Freay
(74) *Attorney, Agent, or Firm* — KED & Associated, LLP

(57) ABSTRACT

An linear compressor and a linear motor for a linear compressor is provided. The linear compressor may include a shell, in which a suction inlet may be provided, a cylinder disposed in the shell to define a compression space for a refrigerant, a frame coupled to an outer side of the cylinder, a piston reciprocated in an axial direction within the cylinder, a stator cover coupled to the frame, and a linear motor supported by the frame and the stator cover to provide power to the piston. The stator cover may include a body, and at least one frame coupling portion coupled to the frame. The at least one frame coupling portion may extend from the body toward the frame.

16 Claims, 10 Drawing Sheets

(51) Int. Cl.
*F04B 39/12* (2006.01)
*H02K 33/16* (2006.01)
*H02K 1/14* (2006.01)
*H02K 1/18* (2006.01)
*H02K 7/08* (2006.01)

(52) U.S. Cl.
CPC ............. *H02K 1/185* (2013.01); *H02K 7/08* (2013.01); *H02K 33/16* (2013.01)

(56) References Cited

U.S. PATENT DOCUMENTS

| | | | |
|---|---|---|---|
| 8,747,081 B2 * | 6/2014 | Kang | .............. F04B 35/045 310/15 |
| 2004/0425863 | 12/2004 | Hong et al. | |
| 2006/0093495 A1 * | 5/2006 | Oh | ............. F04B 35/045 417/417 |
| 2006/0152102 A1 | 7/2006 | Jeong et al. | |
| 2006/0220473 A1 * | 10/2006 | Ueda | .............. H02K 33/16 310/12.25 |
| 2009/0252625 A1 * | 10/2009 | Lee | .............. F04B 39/0044 417/437 |
| 2010/0310393 A1 * | 12/2010 | Lee | .............. H02K 33/16 417/417 |
| 2012/0024148 A1 | 2/2012 | Kang et al. | |
| 2013/0129540 A1 * | 5/2013 | Song | .............. F04B 35/045 417/415 |

FOREIGN PATENT DOCUMENTS

| | | |
|---|---|---|
| CN | 1805243 | 7/2006 |
| CN | 1809952 | 7/2006 |
| CN | 101952590 | 1/2011 |
| EP | 1 635 442 | 3/2006 |
| KR | 10-2010-0112478 | 10/2010 |

* cited by examiner

LINEAR COMPRESSOR AND A LINEAR MOTOR FOR A LINEAR COMPRESSOR

CROSS-REFERENCE TO RELATED APPLICATION(S)

This application claims priority under 35 U.S.C. §119 to Korean Application No. 10-2014-0091881, filed in Korea on Jul. 21, 2014, and Korean Application No. 10-2014-0091882, filed in Korea on Jul. 21, 2014, whose entire disclosures are hereby incorporated by reference.

BACKGROUND

1. Field

A linear compressor and a linear motor for a linear compressor are disclosed herein.

2. Background

Cooling systems are systems in which a refrigerant is circulated to generate cool air. In such a cooling system, processes of compressing, condensing, expanding, and evaporating the refrigerant may be repeatedly performed. For this, the cooling system may include a compressor, a condenser, an expansion device, and an evaporator. Also, the cooling system may be installed in a refrigerator or air conditioner, which is a home appliance.

In general, compressors are machines that receive power from power generation devices, such as electric motors or turbines, to compress air, refrigerants, or another working gas, thereby increasing a pressure of the working gas. Compressors are being widely used in home appliances or industrial machineries, such as refrigerators and air-conditioners.

Compressors may be largely classified into a reciprocating compressor, in which a compression space into and from which a working gas is suctioned and discharged, is defined between a piston and a cylinder to compress the working gas while the piston is linearly reciprocated within the cylinder; a rotary compressor, in which a compression space into and from which a working gas is suctioned and discharged, is defined between a roller that eccentrically rotates and a cylinder to compress a refrigerant while the roller is eccentrically rotated along an inner wall of the cylinder; and a scroll compressor, in which a compression space into and from which a working gas is suctioned and discharged, is defined between an orbiting scroll and a fixed scroll to compress the working gas while the orbiting scroll is rotated along the fixed scroll. In recent years, a linear compressor, which is directly connected to a drive motor and in which a piston is linearly reciprocated, to improve compression efficiency without mechanical loss due to movement conversion and having a simple structure, is being widely developed. Generally, such a linear compressor is configured to suction and compress a working gas, such as a refrigerant, while the piston is linearly reciprocated within a cylinder by a linear motor in a sealed shell and discharge the compressed refrigerant.

BRIEF DESCRIPTION OF THE DRAWINGS

Embodiments will be described in detail with reference to the following drawings in which like reference numerals refer to like elements, and wherein.

DETAILED DESCRIPTION

Figure 1:
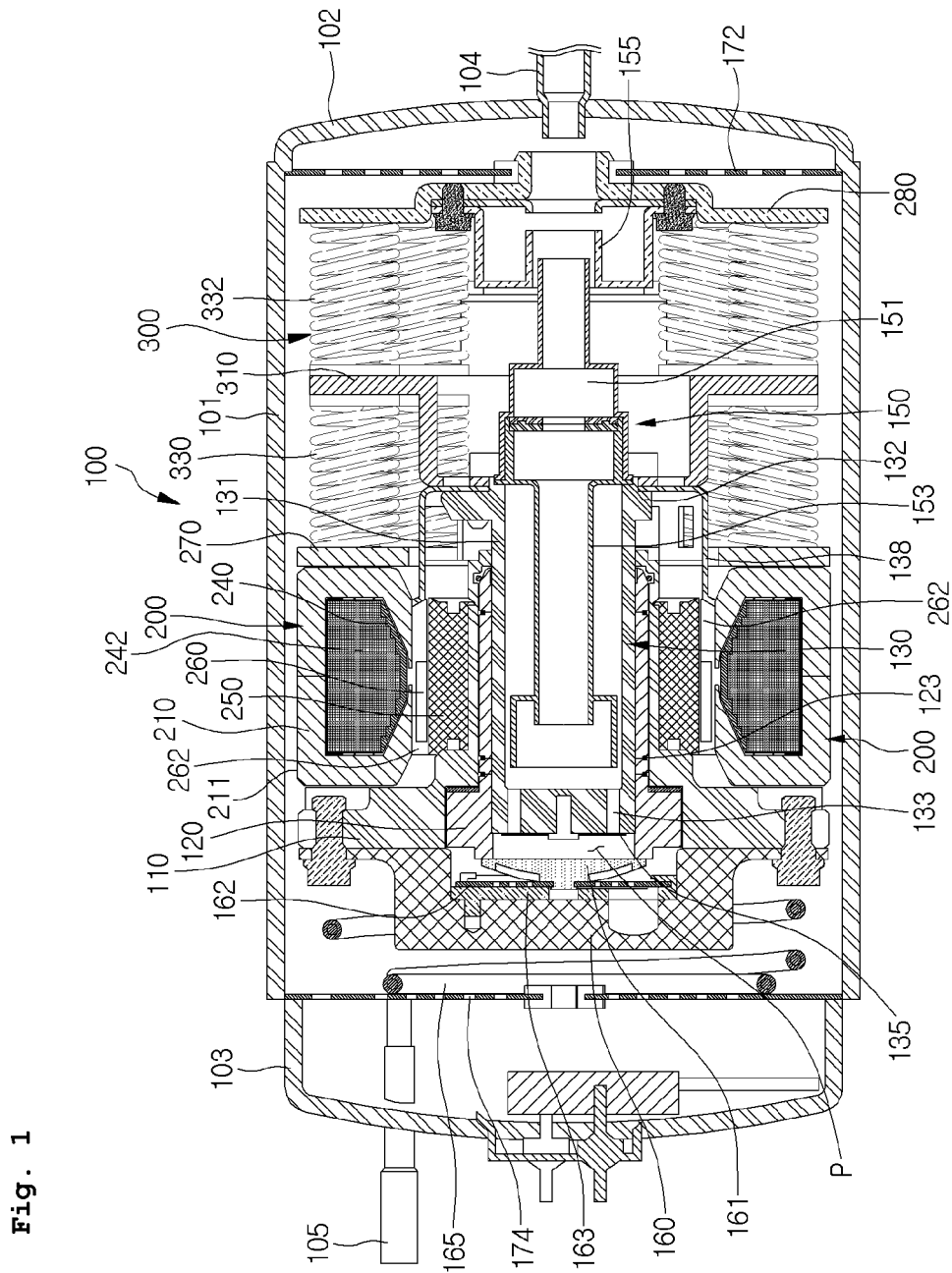
FIG. 1 is a cross-sectional view of a linear compressor according to an embodiment.

Reference will now be made in detail to embodiments, examples of which are illustrated in the accompanying drawings. Where possible, like reference numerals have been used to indicate like elements, and repetitive disclosure has been omitted.

In the following detailed description of embodiments, reference is made to the accompanying drawings that form a part hereof, and in which is shown by way of illustration specific embodiments which may be practiced. These embodiments are described in sufficient detail to enable those skilled in the art to practice, and it is understood that other embodiments may be utilized and that logical structural, mechanical, electrical, and chemical changes may be made without departing from the spirit or scope. To avoid detail not necessary to enable those skilled in the art to practice, the description may omit certain information known to those skilled in the art. The following detailed description is, therefore, not to be taken in a limiting sense.

FIG. 1 is a cross-sectional view of a linear compressor according to an embodiment. Referring to FIG. 1, a linear compressor 100 according to an embodiment may include a shell 101 having an approximately cylindrical shape, a first cover 102 coupled to a first side of the shell 101, and a second cover 103 coupled to a second side of the shell 101. For example, the linear compressor 100 may be mounted on or in a product in a state in which the linear compressor 100 is laid out in a horizontal direction. The first cover 102 may be disposed on or at a right or first lateral side of the shell 101, and the second cover 103 may be disposed on or at a left or second lateral side of the shell 101. Each of the first and second covers 102 and 103 may be understood as one component of the shell 101.

The linear compressor 100 may further include a cylinder 120 provided in the shell 101, a piston 130 that linearly reciprocates within the cylinder 120, and a motor assembly 200 that serves as a linear motor to apply a drive force to the piston 130. When the linear motor operates, the piston 130 may be linearly reciprocated at a high rate. The linear compressor 100 according to this embodiment may have a drive frequency of about 100 Hz, for example.

The linear compressor 100 may further include a suction inlet 104, through which refrigerant may be introduced, and a discharge outlet 105, through which the refrigerant compressed in the cylinder 120 may be discharged. The suction inlet 104 may be coupled to the first cover 102, and the discharge outlet 105 may be coupled to the second cover 103.

The refrigerant suctioned in through the suction inlet 104 may flow into the piston 130 via a suction muffler 150. While the refrigerant passes through the suction muffler 150, noise may be reduced. The suction muffler 150 may include a first muffler 151, and a second muffler 153 coupled to the first muffler 151. At least a portion of the suction muffler 150 may be disposed within the piston 130.

The piston 130 may include a piston body 131 having an approximately cylindrical shape, and a piston flange 132 that extends from the piston body 131 in a radial direction. The piston body 131 may be reciprocated within the cylinder 120, and the piston flange 132 may be reciprocated outside of the cylinder 120.

The piston 130 may be formed of a non-magnetic material, such as an aluminum-based material, such as aluminum or an aluminum alloy. As the piston 130 may be formed of the aluminum material, a magnetic flux generated in the motor assembly 200 may not be transmitted to the piston 130, and thus, may be prevented from leaking outside of the piston 130. The piston 130 may be manufactured by a forging process, for example.

The cylinder 120 may be formed of a non-magnetic material, such as aluminum-based material, such as aluminum or an aluminum alloy. The cylinder 120 and the piston 130 may have a same material composition ratio, that is, type and composition ratio. As the cylinder 120 may be formed of the aluminum-based material, the magnetic flux generated in the motor assembly (linear motor) 200 may not be transmitted to the cylinder 120, thereby preventing the magnetic flux from leaking outside of the cylinder 120. The cylinder 120 may be formed by extruded rod processing, for example.

Also, as the piston 130 may be formed of the same material as the cylinder 120, the piston 130 may have a same thermal expansion coefficient as the cylinder 120. During operation of the linear compressor 10, a high-temperature environment (about 100° C.) is created in the shell 100. As the piston 130 and the cylinder 120 may have the same thermal expansion coefficient, they may thus have a same amount of thermal deformation. As a result, the piston 130 and the cylinder 120 may be thermally deformed with sizes and in directions different from each other to prevent the piston 130 from interfering with the cylinder 120 while the piston 130 moves.

The cylinder 120 may be configured to accommodate at least a portion of the suction muffler 150 and at least a portion of the piston 130.

A compression space P, in which the refrigerant may be compressed by the piston 130, may be defined in the cylinder 120. A suction hole 133, through which the refrigerant may be introduced into the compression space P, may be defined in a front portion of the piston 130, and a suction valve 135 to selectively open the suction hole 133 may be disposed on or at a front side of the suction hole 133. A coupling hole, to which a predetermined coupling member may be coupled, may be defined in an approximately central portion of the suction valve 135.

A discharge cover 160 that defines a discharge space or discharge passage for the refrigerant discharged from the compression space P, and a discharge valve assembly 161, 162, and 163 coupled to the discharge cover 160 to selectively discharge the refrigerant compressed in the compression space P may be provided at a side of the compression space P. The discharge valve assembly 161, 162, and 163 may include a discharge valve 161 to introduce the refrigerant into the discharge space of the discharge cover 160 when a pressure within the compression space P is above a predetermined discharge pressure, a valve spring 162 disposed between the discharge valve 161 and the discharge cover 160 to apply an elastic force in an axial direction, and a stopper 163 to restrict deformation of the valve spring 162.

The term "compression space P" may refer to a space defined between the suction valve 135 and the discharge valve 161. The suction valve 135 may be disposed at a first side of the compression space P, and the discharge valve 161 may be disposed at a second side of the compression space P, that is, at a side opposite to the suction valve 135. Also, the discharge valve 161 may be movably disposed at a front end of the cylinder 120.

The term "axial direction" may refer to a direction in which the piston 130 is reciprocated, or a direction in which "a permanent magnet" is reciprocated. In the axial direction, a direction from the suction inlet 104 toward the discharge outlet 105, that is, a direction in which the refrigerant flows, may be defined as a "frontward direction", and a direction opposite to the frontward direction may be defined as a "rearward direction". The term "radial direction" may refer to a direction perpendicular to the direction in which the piston 130 is reciprocated.

The stopper 163 may be seated on the discharge cover 160, and the valve spring 162 may be seated at a rear side of the stopper 163. The discharge valve 161 may be coupled to the valve spring 162, and a rear portion or rear surface of the discharge valve 161 may be supported by a front surface of the cylinder 120. The valve spring 162 may include a plate spring, for example.

While the piston 130 is linearly reciprocated within the cylinder 120, when the pressure in the compression space P is below the predetermined discharge pressure and a predetermined suction pressure, the suction valve 135 may be opened to suction the refrigerant into the compression space P. In contrast, if the pressure in the compression space P is not less than the predetermined suction pressure, the refrigerant in the compression space P may be compressed in a state in which the suction valve 135 is closed.

When the pressure in the compression space P is the predetermined discharge pressure or more, the valve spring 162 may be deformed to open the discharge valve 161 and the refrigerant may be discharged from the compression space P into the discharge space of the discharge cover 160. The refrigerant flowing into the discharge space of the discharge cover 160 may be introduced into a loop pipe 165. The loop pipe 165 may be coupled to the discharge cover 160 to extend to the discharge outlet 105, thereby guiding the compressed refrigerant in the discharge space into the discharge outlet 105. For example, the loop pipe 165 may have a shape which is wound in a predetermined direction and extends in a rounded shape. Also, the loop pipe 165 may be coupled to the discharge outlet 105.

The linear compressor 100 may further include a frame 110 coupled to an outside of the cylinder 120. The frame 110 may fix the cylinder 120 and be coupled to the cylinder 120 by a separate coupling member, for example. The frame 110 may be disposed to surround the cylinder 120. That is, the cylinder 120 may be accommodated within the frame 110. The discharge cover 160 may be coupled to a front surface of the frame 110.

At least a portion of the high-pressure gaseous refrigerant discharged through the open discharge valve 161 may flow toward an outer circumferential surface of the cylinder 120 through a space formed at a portion at which the cylinder 120 and the frame 110 are coupled to each other. The refrigerant may be introduced into the cylinder 120 through an inflow hole 123 disposed on or in the cylinder 120. The introduced refrigerant may flow into a space defined between the piston 130 and the cylinder 120 to allow an outer circumferential surface of the piston 130 to be spaced apart from an inner circumferential surface of the cylinder 120. Thus, the introduced refrigerant may serve as a "gas bearing" that reduces friction between the piston 130 and the cylinder 120 while the piston 200 is reciprocated.

The motor assembly 200 may include a first stator 210 that surrounds the cylinder 120, a second stator 250 spaced apart from the first stator 210, and a permanent magnet 260 disposed between the first stator 210 and the second stator 250. In embodiments, one of the first stator 210 or the second stator 250 may be an outer stator, and the other one may be an inner stator. In FIG. 1, for example, the first stator 210 is the outer stator, and the second stator 250 is the inner stator.

The permanent magnet 260 may linearly reciprocate due to mutual electromagnetic force between the first stator 210 and the second stator 250. The permanent magnet 260 may include a single magnet having one pole, or a combination of multiple magnets having three poles. The permanent magnet 260 may include a plurality of permanent magnets 260 disposed at an outside of the second stator 250.

The permanent magnet(s) 260 may be coupled to the piston 130 by a connection member 138. In detail, the connection member 138 may be coupled to the piston flange 132 and be bent to extend toward the permanent magnet(s) 260. As the permanent magnet(s) 260 is reciprocated, the piston 130 may be reciprocated together with the permanent magnet(s) 260 in the axial direction.

The linear motor 200 may further include a fixing member 262 to fix the permanent magnet(s) 260 to the connection member 138. The fixing member 262 may be formed of a composition in which a glass fiber or carbon fiber is mixed with a resin. The fixing member 262 may be provided to surround inside and outside of the permanent magnet(s) 260 to firmly maintain a coupled state between the permanent magnet(s) 260 and the connection member 138.

The first stator 210 may include coil winding bodies 240 and 242, and a plurality of stator core blocks 211 spaced apart from each other in a circumferential direction of the coil winding bodies 240 and 242. Each of the plurality of stator core blocks 211 may include a plurality of core blocks. The stator core 211 may be provided such that a plurality of laminations are stacked in a circumferential direction, and may be disposed to surround the coil winding bodies 240 and 242.

The coil wounding bodies 240 and 242 may include a bobbin 240, and a coil 242 wound in a circumferential direction of the bobbin 240. The coil 242 may have a polygonal section, for example, a hexagonal section.

The linear compressor 100 may further include a support 310 that supports the piston 130, and a back cover 280 spaced apart from one side of the support 310 and spring-coupled to the support 310. The support 310 may be coupled to the piston flange 132 and the connection member 138 by a predetermined coupling member, for example.

A suction guide 155 may be coupled to a front portion of the back cover 280. The suction guide 155 may guide the refrigerant suctioned through the suction inlet 104 to introduce the refrigerant into the suction muffler 150.

The linear compressor 100 may further include a spring device 300 having a plurality of springs 330 and 332, which are adjustable in natural frequency, to allow the piston 130 to perform a resonant motion. The plurality of springs 330 and 332 may include at least one first spring 330 supported between the support 310 and a stator cover 270, and at least one second spring 332 supported between the support 300 and the back cover 280.

The linear compressor 100 may further include plate springs 172 and 174, respectively, disposed on both sides of the shell 101 to allow inner components of the compressor 100 to be supported by the shell 101. The plate springs 172 and 174 may include a first plate spring 172 coupled to the first cover 102, and a second plate spring 174 coupled to the second cover 103. For example, the first plate spring 172 may be fitted into a portion at which the shell 101 and the first cover 102 are coupled to each other, and the second plate spring 174 may be fitted into a portion at which the shell 101 and the second cover 103 are coupled to each other.

Figure 2:
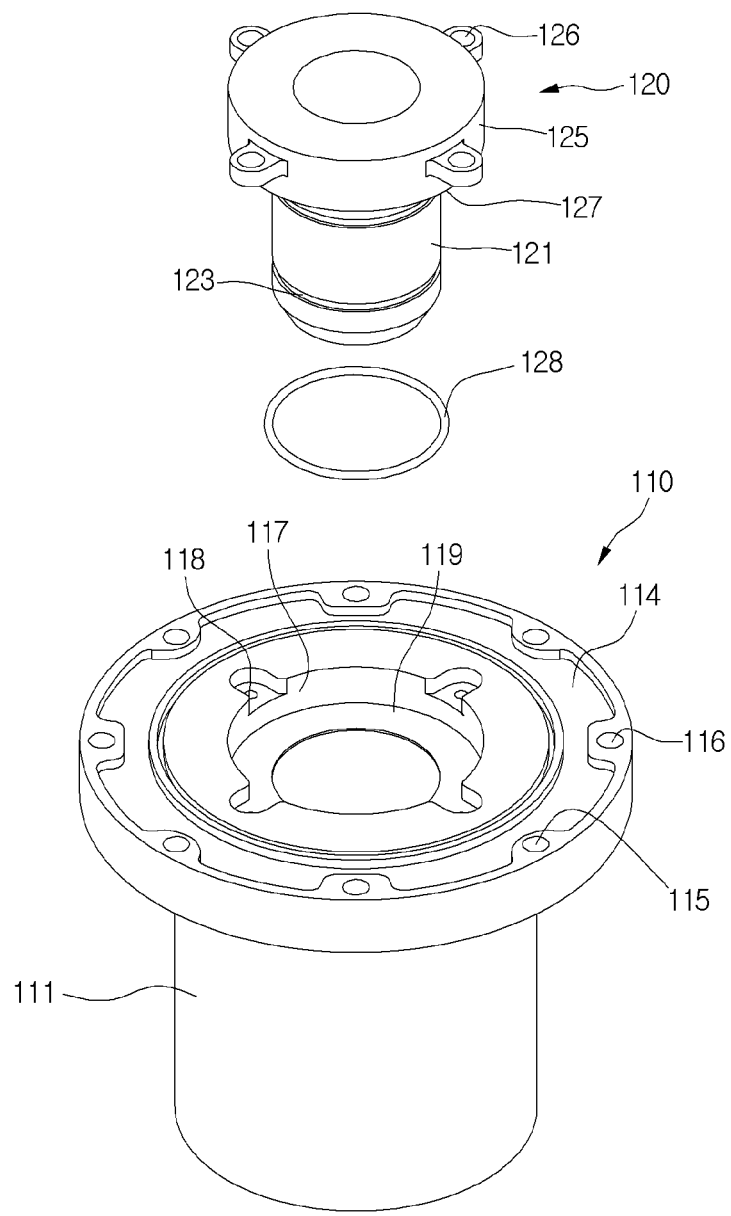
FIG. 2 is a perspective view of a cylinder and a frame of the linear compressor of FIG. 1.

FIG. 2 is a perspective view of a cylinder and a frame of the linear compressor of FIG. 1. Referring to FIG. 2, the cylinder 120 may include a cylinder body 121 having an approximately cylindrical shape, and a cylinder flange 125 that extends from the cylinder body 121 in a radial direction.

The cylinder body 121 may include at least one inflow hole 123, into which gas refrigerant may be introduced. The inflow hole 123 may be recessed in an approximately circular shape along a circumferential surface of the cylinder body 121.

The at least one inflow hole 123 may include a plurality of inflow holes 123. The plurality of inflow holes 123 may be spaced apart from each other in an axial direction on an outer circumferential surface of the cylinder body 121.

A plurality of coupling portions 126 to be coupled to the frame 110 may be disposed on the cylinder flange 125. The plurality of coupling portions 126 may protrude outward from an outer circumferential surface of the cylinder flange 125. The plurality of coupling portions 126 may be coupled to a plurality of cylinder coupling grooves 118 of the frame 110 by a predetermined coupling member, for example.

The cylinder flange 125 may include a seat surface 127 to be seated on the frame 110. The seat surface 127 may be one surface of the cylinder flange 125 that extends from the cylinder body 121 in a radial direction.

The frame 110 may include a frame body 111 that surrounds the cylinder body 121, and a cover coupling portion 114 that extends in a radial direction of the frame body. The cover coupling portion 114 may be coupled to the discharge cover 160.

The cover coupling portion 114 may include a plurality of discharge cover coupling holes 116, into which the coupling member coupled to the discharge cover 160 may be inserted, and the plurality of the cylinder coupling grooves 118, into which the coupling member coupled to the cylinder flange 125 may be inserted. The cover coupling portion 114 may include a plurality of stator cover coupling holes 115, to which the stator cover 270 and the coupling member may be coupled. The plurality of stator cover coupling holes 115 and the plurality of discharge cover coupling holes 116 may be alternately disposed.

The frame 110 may have an insertion portion 117 recessed backward from the cover coupling portion 114 to allow the cylinder flange 125 to be inserted therein. That is, the insertion portion 117 may be disposed to surround the outer circumferential surface of the cylinder flange 125. The insertion portion 117 may have a recessed depth corresponding to a front to rear width of the cylinder flange 125.

A predetermined refrigerant flow space may be defined between an inner circumferential surface of the insertion portion 117 and the outer circumferential surface of the cylinder flange 125. The high-pressure gas refrigerant discharged from the discharge valve 161 may flow toward the outer circumferential surface of the cylinder body 121 via the refrigerant flow space.

The insertion portion 117 may include a support surface 119 that faces the seat surface 127 of the cylinder flange 125. The seat surface 127 of the cylinder flange 125 may be seated on the support surface 119 of the insertion portion 117. Alternatively, the seat surface 127 of the cylinder flange 125 may be seated on a filter in a state in which the filter is placed on the support surface 119.

The linear compressor 100 may further include a sealing member 128 disposed between an outer circumferential surface of the cylinder body 121, and an inner circumferential surface of the frame body 111 to seal a space between the cylinder 120 and the frame 110. The sealing member 128 may have a ring shape.

Figure 3:
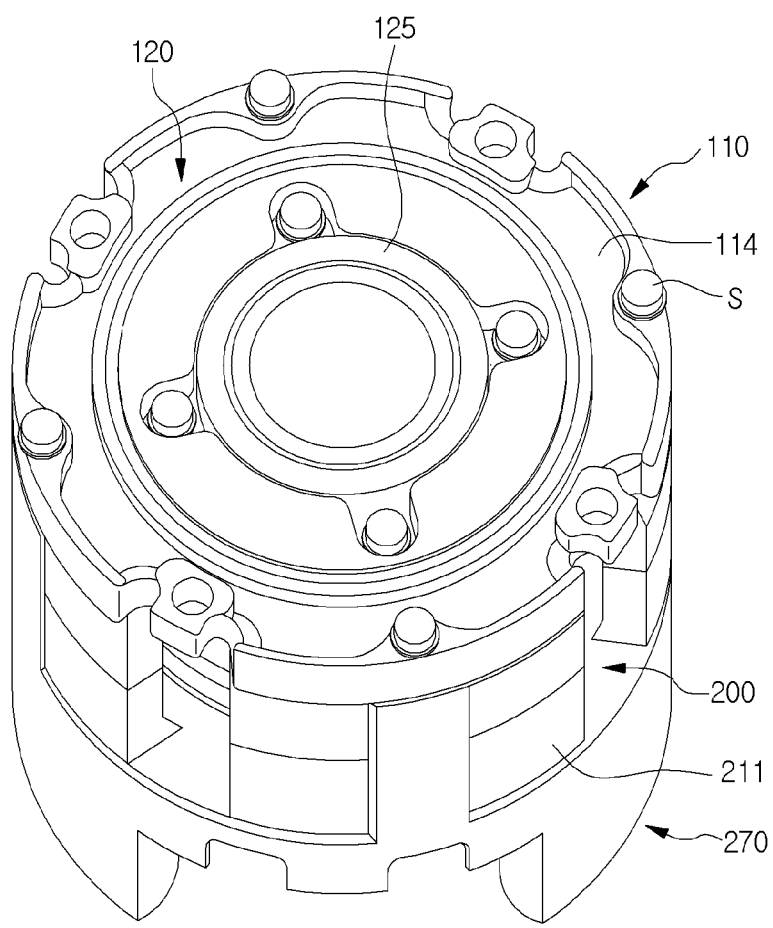
FIG. 3 is a view illustrating a state in which a stator cover is coupled to the frame of the linear compressor of FIG. 1.
Figure 4:
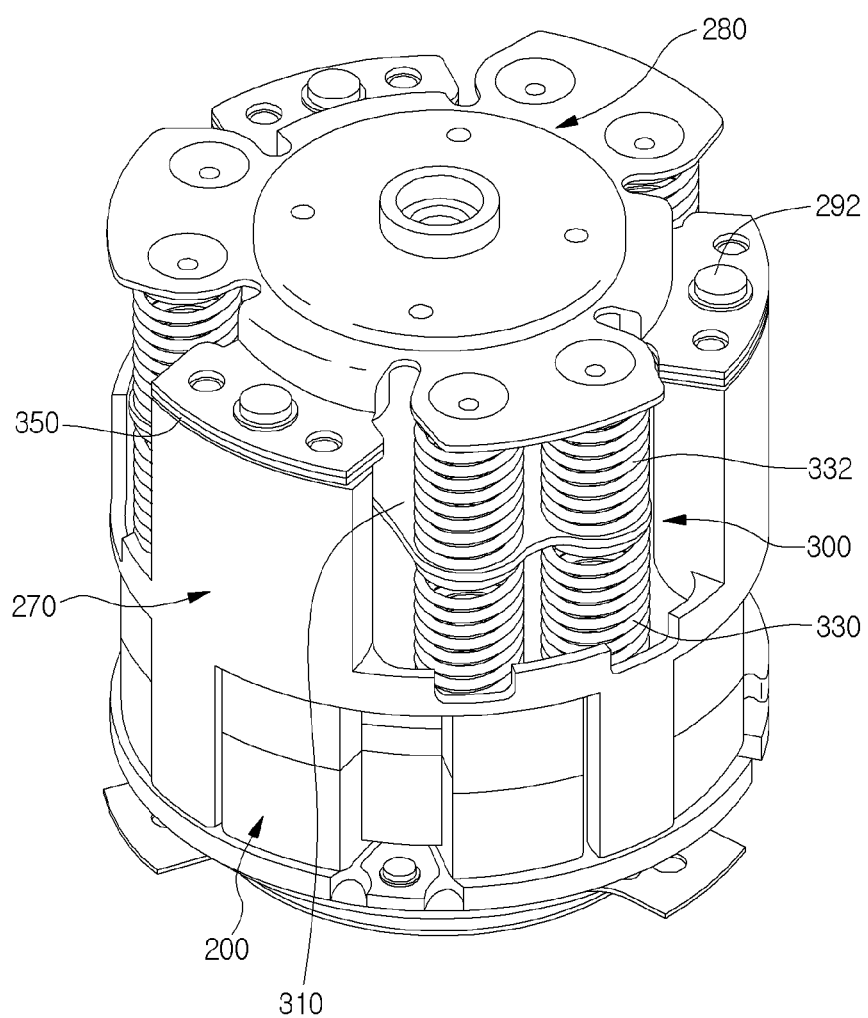
FIG. 4 is a view illustrating a state in which a back cover is coupled to the stator cover of the linear compressor of FIG. 1.
Figure 5:
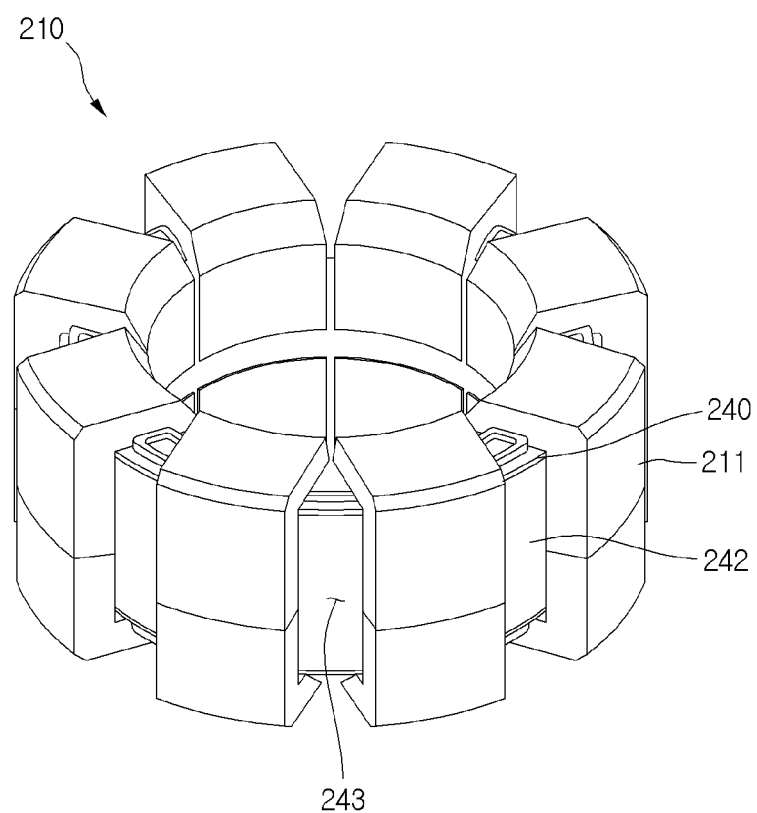
FIG. 5 is a perspective view of a first stator of a linear motor of the linear compressor of FIG. 1.
Figure 6:
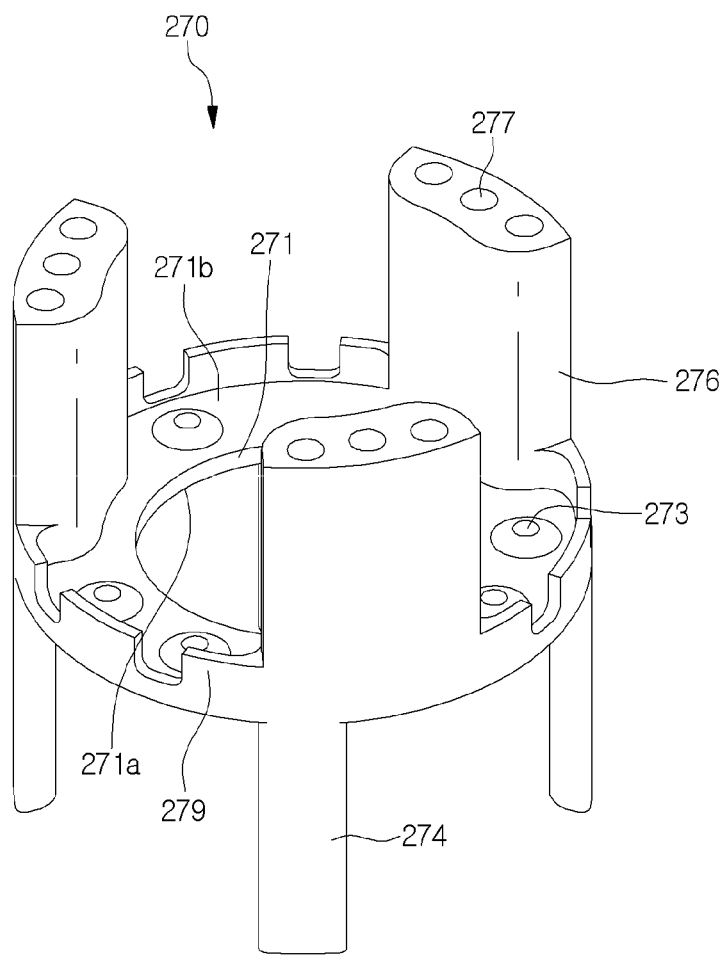
FIG. 6 is a perspective view of the stator cover of the linear compressor of FIG. 1.
Figure 7:
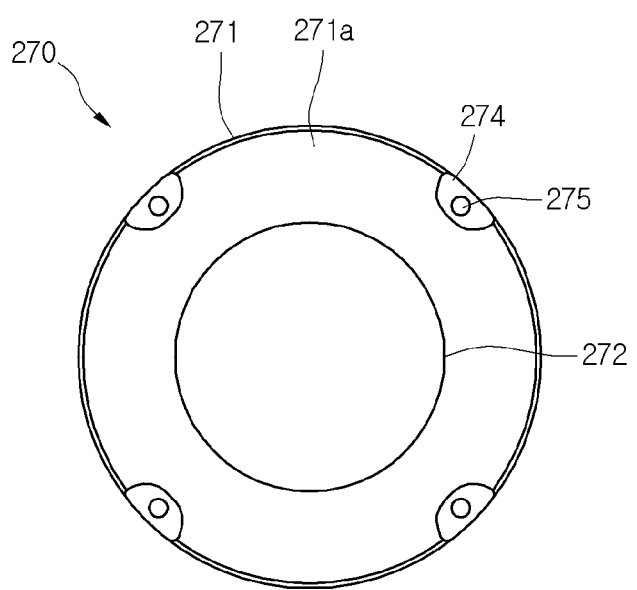
FIG. 7 is a view illustrating an arrangement of a frame coupling portion of the stator cover of FIG. 6.

FIG. 3 is a view illustrating a state in which a stator cover is coupled to the frame of the linear compressor of FIG. 1. FIG. 4 is a view illustrating a state in which a back cover is coupled to the stator cover of the linear compressor of FIG. 1. FIG. 5 is a perspective view of a first stator of a linear motor of the linear compressor of FIG. 1. FIG. 6 is a perspective view of the stator cover of the linear compressor of FIG. 1. FIG. 7 is a view illustrating an arrangement of a frame coupling portion of the stator cover of FIG. 6.

Referring to FIGS. 3 to 7, the first stator 210 of the motor assembly (linear motor) 200 may include the bobbin 240, around which the coil 242 may be wound in a circumferential direction, and the plurality of stator core blocks 211 that surround the bobbin 240 in the circumferential direction. A space 243 may be defined between two adjacent stator core blocks 211.

The stator cover 270 may include a body 271 having an opening 272, through which the piston 130 may pass, and at least one frame coupling portion 274 that extends from the body 271 toward the frame 110. The at least one frame coupling portion 274 may extend from a first surface 271a of the body 271. The first spring 330 may be supported by a second surface 271b that faces the first surface 271a of the body 271.

A plurality of the frame coupling portions 274 may extend from the body 271 so as to firmly couple the stator cover 270 to the frame 110. The plurality of frame coupling portions 274 may be spaced apart from each other in a circumferential direction of the body 271.

One frame coupling portion 274 may be disposed in the space 243 between two adjacent stator core blocks 211. As the one frame coupling portion 274 is disposed in the space 243 between two adjacent stator core blocks 211, the stator cover 270 may not increase in size in a radial direction.

As illustrated in FIG. 3, at least two stator core blocks 211 may be disposed between two adjacent frame coupling portions 274. Each of the frame coupling portions 274 may include a coupling groove 275 to receive a coupling member S.

When each of the frame coupling portions 274 is disposed in the space 243 between two stator core blocks 211, the coupling groove 275 may be aligned with the stator cover coupling hole 115 of the frame 110. The coupling member S may be coupled to the stator cover coupling hole 115 and the coupling groove 275 to face the frame coupling portion 274 at a side of the frame 110. According to this embodiment, as the coupling member S passes through the frame 110 and is coupled to the frame coupling portion 274 to extend from the body 271 of the stator cover 270, the frame coupling portion 274 may absorb a coupling force of the coupling member S.

Thus, as the frame coupling portion 274 absorbs the coupling force even though the frame coupling portion 274 is deformed during the coupling process of the coupling member S, deformation of the body 271 may be prevented. When the deformation of the body 271 is prevented, the body 271 may not interfere with peripheral components. Also, the first spring 330 to resonantly move the piston 130 may be supported in position by the body 271.

Also, as at least two stator core blocks 211 are disposed between two adjacent frame coupling portions 274, the stator cover 270 may be coupled to the frame 110 through a few number of frame coupling portions 274. Thus, the stator cover 270 may be simplified in structure, and the number of frame coupling portions coupled to the stator cover 270 may be reduced to reduce a number of processes for coupling the coupling member.

The stator cover 270 may further include at least one back cover coupling portion 276 that extends from the second surface 271b of the body 271 in a direction opposite to a direction in which the frame coupling portion 274 extends. That is, the at least one back cover coupling portion 276 may extend toward the back cover 280.

A plurality of the back cover coupling portions 276 may extend from the body 271 so as to firmly couple the stator cover 270 to the back cover 280. The plurality of back cover coupling portions 276 may be spaced apart from each other in the circumferential direction of the body 271.

A coupling groove 277 to couple a coupling member 292 may be defined in each of the plurality of back cover coupling portions 276. The coupling groove 275 of the each of the frame coupling portions 274 and the coupling groove 277 of each of the back cover coupling portions 276 may be disposed without overlapping each other in an axial direction.

The stator cover 270 may further include a reinforcing rib 279 to connect the body 271 to the back cover coupling portion 276. That is, the reinforcing rib 279 may be disposed on the second surface 271b of the body 271. The reinforcing rib 279 may prevent the back cover coupling portion 276 from being deformed toward the outside in the radial direction of the body 271 while the coupling member 292 is coupled to the back cover 280 and the back cover coupling portion 276.

A plurality of spring coupling protrusions 273, each of which may be coupled to one of a plurality of the first springs 330, may be provided on the second surface 271b of the body 271 of the stator cover 270. A plurality of the first springs 330 may be seated on the second surface 271b of the body 271. When the plurality of first springs 330 is seated on the second surface 271b of the body 271, each of the spring coupling protrusions 273 may be fitted into one of the plurality of first springs 330. Thus, the spring coupling protrusion 273 may prevent an end of the first spring 330 that contacts the body 271 from sliding on the body 271.

Figure 8:
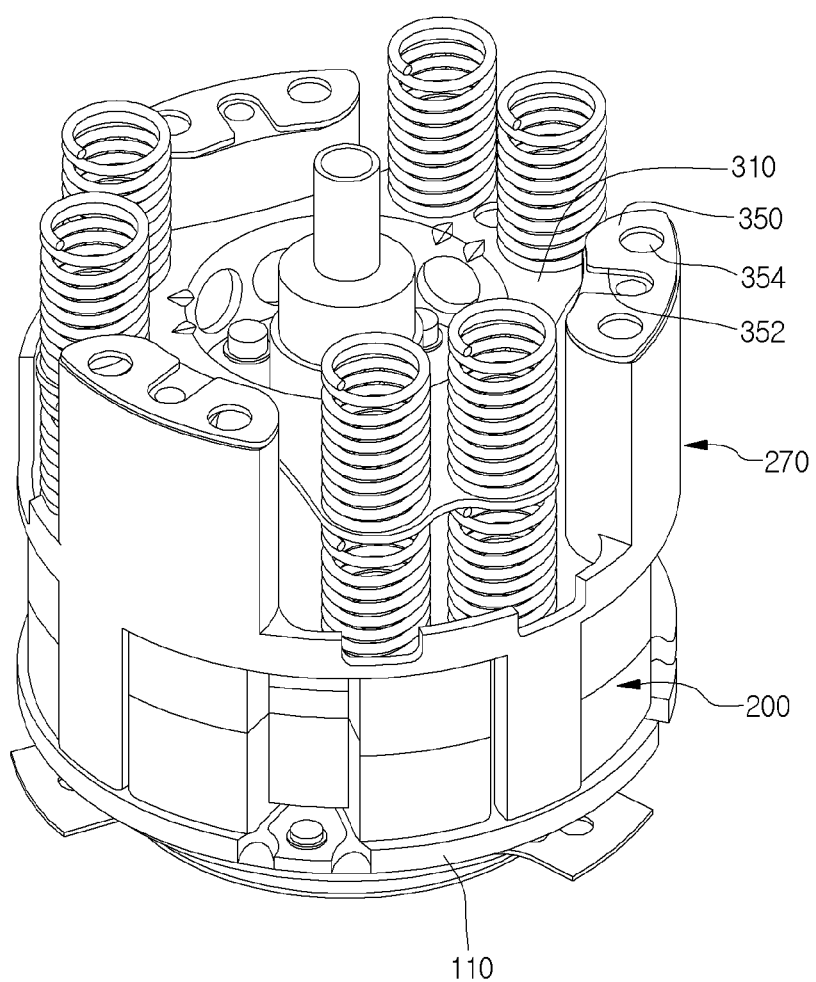
FIG. 8 is a view illustrating a state in which a spring device is seated on the stator cover.
Figure 9:
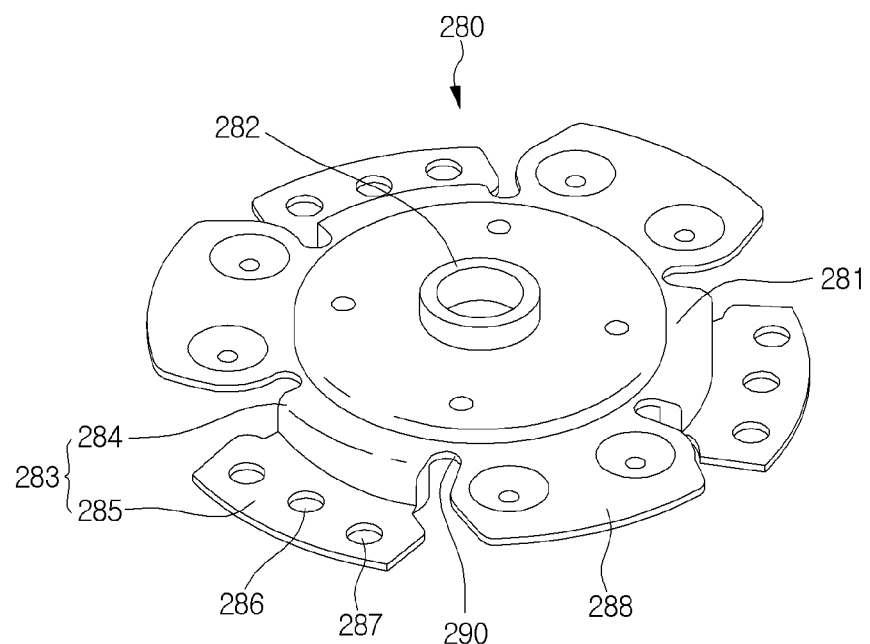
FIGS. 9 and 10 are perspective views of the back cover according to an embodiment.
Figure 10:
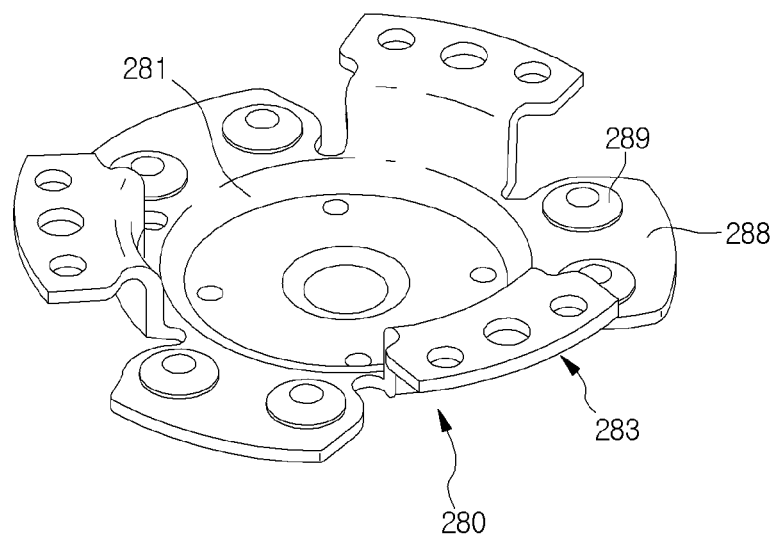

FIG. 8 is a view illustrating a state in which a spring device is seated on the stator cover according to an embodiment. FIGS. 9 and 10 are perspective views of the back cover according to an embodiment.

Referring to FIGS. 6 to 10, the linear compressor 100 may include the spring device 300 to resonantly move the piston 130. The spring device 300 may include the plurality of first springs 330 supported by the stator cover 270, a plurality of the second springs 332 supported by the back cover 280, and the support 310 to support the plurality of first springs 330 and the plurality of second springs 332. The support 310 may be connected to the connection member 138 illustrated in FIG. 1.

The plurality of first springs 330 may be seated on the body 271 in a state in which the plurality of first springs 330 are spaced apart from each other in a circumferential direction of the stator cover 270. The plurality of second springs 332 may be seated on the support 310 in a state in which the plurality of second springs 332 are spaced apart from each other in a circumferential direction of the support 310.

The plurality of second springs 332 may be disposed in a line in an axial direction with the plurality of first springs 330, respectively.

The back cover 280 may include a body 281 having a refrigerant through hole 282, through which the refrigerant may pass. The back cover 280 may further include at least one stator cover coupling portion 283 that extends from the body 281 and coupled to the back cover coupling portion 276, and at least one spring support 288 that extends from the body 281 to support the plurality of second springs 332.

For example, in FIG. 9, the back cover 280 includes a plurality of the stator cover coupling portions 283 and a plurality of the spring supports 288. The plurality of stator cover coupling portions 283 and the plurality of spring supports 288 may be alternately disposed.

Each of the plurality of stator cover coupling portions 283 may include an extension 284 bent from the body 281 in an axial direction, and a coupling flange 285 bent from the extension 284. That is, the coupling flange 285 may be bent from the extension 284 in a direction that crosses the axial direction.

Thus, the body 281 and the coupling flange 285 may be spaced apart from each other in the axial direction. The coupling flange 285 may include a coupling hole 286, to which the coupling member 292 may be coupled. The coupling member 292 may be coupled to the coupling hole 286 and the coupling groove 277 of the back cover coupling portion 276 to face the back cover coupling portion 276 at a side of the coupling flange 285.

According to this embodiment, as the coupling flange 285 is bent from the extension 284 to extend from the body 281 in the axial direction, the stator cover coupling portion 283 may absorb a coupling force of the coupling member 292. Thus, as the stator cover coupling portion 283 absorbs the coupling force even though the stator cover coupling portion 283 is deformed during the coupling process of the coupling member 292, deformation of the body 281 of the back cover 280 may be prevented.

Also, a plurality of guide holes 287 may be defined in the coupling flange 285 to allow guide pins to align the coupling grooves 277 of the back cover coupling portion 276 and the coupling holes 286 to pass therethrough. The coupling hole 286 may be disposed between the plurality of guide holes 287.

A slit 290 may be defined in the body 291 to prevent the coupling force of the coupling member 292 from being transmitted to the spring support 288. The spring support 288 and the coupling flange 285 may be spaced apart from each other in the axial direction.

As transmission of the coupling force of the coupling flange 285 of the coupling member 292 into the spring support 288 is prevented, deformation of the spring support 288 may be prevented to allow the second spring 332 to be supported in position by the spring support 288. Also, the slit 290 may prevent an elastic force of the second spring 332 applied to the spring support 288 from being transmitted to the stator cover coupling portion 283.

A spring coupling protrusion 289 to couple to each of the plurality of second springs 332 may be formed on the spring support 288. A plurality of spring coupling protrusions 289 may be formed on one spring support 288. Thus, as the plurality of second springs 332 may be coupled to the plurality of spring coupling protrusions 289, respectively, the spring coupling protrusion 289 may prevent an end of the second spring 332 contacting the spring support 288 from sliding on the spring support 288.

A spacer 350 may be disposed between the back cover coupling portion 276 and the coupling flange 285. That is, the coupling member 292 may be coupled to the coupling flange 285 and the back cover coupling portion 276 in a state in which the spacer 350 is disposed between the back cover coupling portion 276 and the coupling flange 285.

The spacer 350 may be configured to prevent a phenomenon in which a distance between the body 271 of the stator cover 270 and the support 310, or a distance between the support 310 and the body 281 of the back cover 280 is not uniformly maintained due to a tolerance generated during a process of manufacturing the back cover 280, the support 310, and the stator cover 270, and the first and second springs 330 and 332 from occurring. Thus, the spacer 350 may vary in thickness according to distances between the body 271 of the stator cover 270 and the support 310, or between the support 310 and the body 281 of the back cover 280.

The spacer 350 may include a slot 352 (or a hole), through which the coupling member 350 may pass, and a plurality of guide holes 354, through which guide pins may pass. The slot 352 (or the hole) may be defined between the plurality of guide holes 354.

Embodiments disclosed herein provide a linear compressor and a linear motor for a linear compressor.

Embodiments disclosed herein provide a linear compressor that may include a shell, in which a suction inlet may be provided; a cylinder disposed in the shell to define a compression space for a refrigerant; a frame coupled to an outer side of the cylinder; a piston reciprocated in an axial direction within the cylinder; a stator cover coupled to the frame; and a linear motor supported by the frame and the stator cover to provide power to the piston. The stator cover may include a body, and at least one frame coupling portion coupled to the frame. The at least one frame coupling portion may extend from the body toward the frame.

Embodiments disclosed herein further provide a linear compressor that may include a shell, in which a suction inlet may be provided; a cylinder disposed in the shell to define a compression space for a refrigerant; a frame coupled to an outer side of the cylinder; a piston reciprocated in an axial direction within the cylinder; a linear motor to provide power to the piston; a stator cover to support the linear motor together with the frame; a spring device or spring to allow the piston to resonantly move; and a back cover coupled to the stator cover. The back cover may support the spring device.

Embodiments disclosed herein further provide a linear compressor that may include a shell, in which a suction inlet that may be provided; a cylinder disposed in the shell to define a compression space for a refrigerant; a frame coupled to an outer side of the cylinder; a piston reciprocated in an axial direction within the cylinder; a linear motor to provide power to the piston; a stator cover to support the linear motor; a spring device or spring to elastically support the piston; and a stator cover to support the spring device. The stator cover may include a frame coupling portion coupled to the frame, and a back cover coupling portion coupled to the back cover.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor, comprising
a shell, in which a suction inlet is provided;
a cylinder disposed in the shell to define a compression space for a refrigerant;
a frame coupled to an outer side of the cylinder;
a piston reciprocated in an axial direction within the cylinder;
a stator cover coupled to the frame;
a back cover coupled to the stator cover;
a spring device disposed between the stator cover and the back cover, to elastically support the piston; and
a linear motor supported by the frame and the stator cover to provide power to the piston, the linear motor inducing a plurality of stator core blocks wherein the stator cover comprises:
  a stator cover body;
  a plurality of frame coupling portions coupled to the frame, wherein the plurality of frame coupling portions extends from the stator cover body towards the frame; and
  a plurality of back cover coupling portions that extends from the stator cover body in a direction opposite to the plurality of frame coupling portions, the plurality of back cover coupling portions being coupled to the back cover, wherein the back cover comprises:
    a back cover body;
    a plurality of stator cover coupling portions coupled to the stator cover;
    a plurality of spring supports to support the spring device; and
    a plurality of slits, and wherein each of the plurality of slits is disposed between adjacent stator cover coupling portions and spring supports.

2. The linear compressor according to claim 1, wherein the linear motor further comprises:
a bobbin around which a coil is wound, wherein the plurality of the stator core blocks is spaced apart from each other in a circumferential direction, wherein the plurality of stator core blocks surrounds the bobbin, and wherein each of the plurality of frame coupling portions is disposed between two adjacent stator core blocks of the plurality of stator core blocks.

3. The linear compressor according to claim 1, wherein the plurality of frame coupling portions is spaced apart from each other in a circumferential direction of the stator cover body.

4. The linear compressor according to claim 2, wherein at least two stator core blocks of the plurality of stator core blocks are disposed between two adjacent frame coupling portions of the plurality of frame coupling portions.

5. The linear compressor according to claim 1, wherein the frame comprises a coupling hole through which a coupling member penetrates, and wherein each of the plurality of frame coupling portions comprises a coupling groove, in which the coupling member is inserted after penetrating through the coupling hole of the frame.

6. The linear compressor according to claim 1, wherein the plurality of back cover coupling portions is spaced apart from each other in a circumferential direction of the stator cover body.

7. The linear compressor according to claim 1, wherein each of the plurality of stator cover coupling portions comprises;
an extension that extends from the back cover body in a radial direction and is bent in the axial direction; and
a coupling flange, which is bent from an end of the extension and includes a coupling hole, through which a coupling member penetrates and wherein each of the plurality of back cover coupling portions comprises a coupling groove, in which the coupling member is inserted.

8. The linear compressor according to claim 7, further comprising a spacer disposed between the coupling flange and the back cover coupling portion.

9. The linear compressor according to claim 8, wherein the spacer comprises a slot, through which the coupling member passes.

10. The linear compressor according to claim 8, wherein a plurality of guide holes is defined in each of the coupling flange and the spacer, and wherein a plurality of guide grooves, is defined in each of the plurality of back cover coupling portions.

11. The linear compressor according to claim 10, wherein the coupling groove is disposed between the plurality of guide grooves.

12. The linear compressor according to claim 1, wherein the plurality of stator cover coupling portions and the plurality of spring support portions are alternately disposed on the back cover.

13. The linear compressor according to claim 1, wherein the spring device comprises a plurality of springs, and wherein each of the plurality of spring supports comprises at least one spring coupling protrusion coupled to one of the plurality of springs.

14. The linear compressor according to claim 7, wherein each of the plurality of spring supports is spaced apart from the coupling flange in the axial direction.

15. The linear compressor according to claim 1, wherein the stator cover further comprises a reinforcing rib that connects the stator cover body to the plurality of back cover coupling portions, and wherein the reinforcing rib extends in the axial direction along an outer edge of the stator cover body.

16. The linear compressor according to claim 1, wherein the stator cover body includes an opening, through which the piston passes.

* * * * *